(12) United States Patent
Brown et al.

(10) Patent No.: US 8,694,591 B2
(45) Date of Patent: Apr. 8, 2014

(54) METHOD AND SYSTEM FOR DISTRIBUTION OF PRESENCE INFORMATION

(75) Inventors: Robert William Brown, Arnprior (CA); Bruno Richard Preiss, Waterloo (CA); Allan Lewis, Waterloo (CA); Richard George, Waterloo (CA); Brian Edward Anthony McColgan, Mississauga (CA); James Andrew Godfrey, Waterloo (CA)

(73) Assignee: BlackBerry Limited, Waterloo (CA)

( * ) Notice: Subject to any disclaimer, the term of this patent is extended or adjusted under 35 U.S.C. 154(b) by 880 days.

(21) Appl. No.: 12/394,834

(22) Filed: Feb. 27, 2009

(65) Prior Publication Data
US 2010/0223333 A1 Sep. 2, 2010

(51) Int. Cl.
*G06F 15/16* (2006.01)

(52) U.S. Cl.
USPC .......................................... 709/206; 709/202

(58) Field of Classification Search
USPC .................... 709/206, 207, 205, 202
See application file for complete search history.

(56) References Cited

U.S. PATENT DOCUMENTS

| | | | | |
|---|---|---|---|---|
| 6,968,052 B2* | 11/2005 | Wullert, II | ............... | 379/210.01 |
| 7,228,335 B2* | 6/2007 | Caughey | ...................... | 709/206 |
| 2003/0078981 A1* | 4/2003 | Harms et al. | .................. | 709/206 |
| 2005/0171799 A1* | 8/2005 | Hull et al. | ......................... | 705/1 |
| 2005/0204007 A1* | 9/2005 | McGregor et al. | ............ | 709/206 |
| 2007/0038720 A1 | 2/2007 | Reding et al. | | |
| 2008/0133580 A1* | 6/2008 | Wanless et al. | ............... | 707/102 |
| 2009/0083382 A1* | 3/2009 | Rosenberg et al. | ........... | 709/206 |
| 2009/0088144 A1* | 4/2009 | Beadle et al. | ................. | 455/419 |
| 2010/0064012 A1* | 3/2010 | Cruse, Jr. | ...................... | 709/206 |
| 2010/0179961 A1* | 7/2010 | Berry et al. | .................... | 707/769 |

FOREIGN PATENT DOCUMENTS

EP 1718049 2/2006
WO 2006125183 11/2006

OTHER PUBLICATIONS

Extensible Messaging and Presence Protocol Specification; www.ietf.org/rfc/rfc3921.txt, Oct. 2004.
OMA Presence Enabler; www.ietf.org/rfc/rfc4479.txt, Jul. 2006.
OMA Presence Enabler; www.ietf.org/rfc/rfc4480.txt, Jul. 2006.

* cited by examiner

*Primary Examiner* — David Lazaro
(74) *Attorney, Agent, or Firm* — Steven Greenberg, Esq.; CRGO Law

(57) ABSTRACT

A method and system for distributing data between a first user and a second user by detecting direct or indirect communication between the first user and the second user, creating an entry for the second user in a roster for the first user, populating the entry for the second user in the roster of the first user with data elements and attributes of the data elements, the data elements and attributes of the data elements indicating what data can be shared with the second user and how the data is to be shared and utilizing the roster of the first user to distribute data reflecting the first user to the second user.

19 Claims, 7 Drawing Sheets

| id Element/Attribute | Telephone Number | Fax Number | Address | Title | Address' |
|---|---|---|---|---|---|
| id1 | x 0x0000 | x 0x0000 | x 0x0000 | x 0x0000 | x 0x0000 |
| id2 | +9085794242 / 0x0221 | x 0x0000 | 240 / 0x0421 | x 0x0000 | P.O Box 123 / 250 |
| User B | +9085551212 / 0x0221 | +9085551212 / 0x0221 | 12 Any Ave... / 0x0221 | Project Mgr. / 0x0221 | x 0x0000 |
| ... | x 0x0000 | x 0x0000 | x 0x0000 | x 0x0000 | x 0x0000 |
| ... | x 0x0000 | x 0x0000 | x 0x0000 | x 0x0000 | x 0x0000 |

| id \ Element/Attribute | Telephone Number | Fax Number | Address | Title | Address' |
|---|---|---|---|---|---|
| id1 | x 0x0000 | x 0x0000 | x 0x0000 | x 0x0000 | x 0x0000 |
| id2 | +9085794242  0x0221 | x 0x0000  242 | x 0x0000  240 | x 0x0000 | P.O Box 123  250 |
| User B | +9085551212  0x0221 | +9085551212  0x0221 | 12 Any Ave…  0x0421 | Project Mgr.  0x0221 | x 0x0000 |
| … | x 0x0000 | x 0x0000 | x 0x0000 | x 0x0000 | x 0x0000 |
| … | x 0x0000 | x 0x0000 | x 0x0000 | x 0x0000 | x 0x0000 |

Fig. 2

METHOD AND SYSTEM FOR DISTRIBUTION OF PRESENCE INFORMATION

FIELD OF THE DISCLOSURE

The present disclosure relates to a data service and in particular to the distribution of data from the data service.

BACKGROUND

A data service for the distribution of data could include a presence information service, a location information service, among others. Distribution of data from a data service can be a difficult problem in both wired and wireless networks. The present disclosure refers to a presence service as an exemplary data service. The use of a presence service is not meant to be limiting, and other data services would be apparent to those skilled in the art.

For a presence service, distribution of presence data can be problematic because presence information can become verbose, particularly when taking into account the subtle nuances for the state of presentities. Verbose communication leads to increased traffic for the network, resulting in less bandwidth being available for other terminals, or reduced service offerings available for each terminal. If the terminal is a wireless device, increased verbosity further leads to increased battery usage since a receiver on the device needs to be turned on for longer periods.

Verbose communication also adds considerable complexity to a client application running on a terminal, among other factors.

Complexity also exists for a presentity needing to 'identify' and authorize possible watchers in current systems.

Various solutions exist to distribute data, including the Extensible Messaging and Presence Protocol (XMPP). XMPP is a protocol evolved from an instant messaging platform known as "Jabber" and defines an extensible markup language (XML) based protocol for the exchange of presence information between a presentity and a watcher. XMPP makes use of a roster mechanism for the management of contact lists. The XML protocol is not optimized for transport, particularly in a wireless network realization.

A second solution is the Open Mobile Alliance (OMA) presence enabler. The OMA presence enabler defines a Session Initiation Protocol (SIP) based protocol for the exchange of presence information between a presentity and a watcher. The OMA presence enabler makes use of information elements, and further permits extension of these information elements based on the Engineering Task Force (IETF) specified PIDF/RPID presence data models. The information elements are protocol independent and do not provide specific directives to the underlying transport layer to optimize delivery. The SIP protocol is a chatty protocol intended primarily for the wired domain and was originally designed for use in wire-line voice over internet protocol (VOIP)/call control applications.

BRIEF DESCRIPTION OF THE DRAWINGS

The present disclosure will be better understood with reference to the drawings in which:

FIG. 2 is a block diagram of a roster matrix with data element attributes;

DETAILED DESCRIPTION

Figure 1:
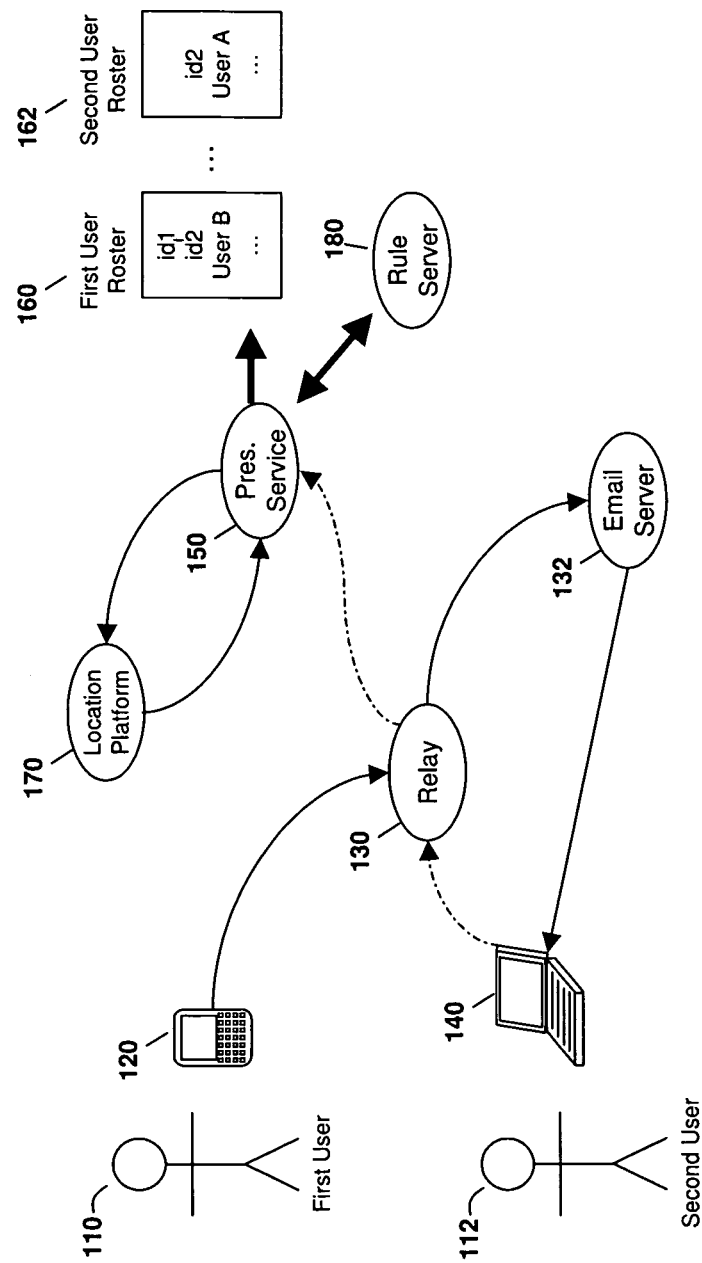
FIG. 1 is a block diagram of network including a presence service having a roster.

As used in the present disclosure, the following terms have the following meanings:
   Presentity—an individual or entity possessing state.
   Presence Source—a logical entity that publishes presence information.
   Watcher—an individual or entity wishing to consume a presentities presence information.

The present disclosure provides a method for distributing data between a first user and a second user comprising: detecting direct or indirect communication between the first user and the second user; creating an entry for the second user in a roster for the first user; populating the entry for the second user in the roster of the first user with data elements and attributes of the data elements, the data elements and attributes of the data elements indicating what data can be shared with the second user and how the data is to be shared; and utilizing the roster of the first user to distribute data reflecting the first user to the second user.

The present disclosure further provides a data service within a network for distributing data, the data service configured to: detect direct or indirect communication between a first user and a second user; create, at the data service, an entry for the second user in a roster for the first user; populate the entry for the second user in the roster of the first user with data elements and attributes of the data elements, said data elements and attributes of the data elements indicating what data can be shared with the second user and how the data is to be shared; and utilize the roster of the first user to distribute data reflecting the first user to the second user.

The present disclosure relates to the delivery and receipt of data from a data service. In the case of a presence data service, the present disclosure relates to the delivery and receipt of presence information relating to a presentity on behalf of a watcher. The protocol is coupled to a particular presence data model. The model includes basic information elements, which capture presence metadata relating to a presentity for later distribution to a series of interested watchers. Information elements, as used herein, include metadata such as telephone numbers, e-mails, personal identification, among others.

The present disclosure further relates to reducing complexity on behalf of a presentity needing to 'identify' and authorize possible watchers in current systems.

Each information element has one or more associated attributes. Element attributes may differ for a given watcher. Such element attributes may include one or more of the following.

One element attributes may be a data type. A data type is a primitive for an associated data element and can include, for example, integers, floating point numbers, Unicode strings, boolean values, among others.

A further element attribute may be a notification type attribute. This could indicate how the protocol distributes associated presence elements and options could include continuous, one shot (i.e. single) or rule based notifications, among others.

A subscription element attribute could indicate a subscription direction for a given presence element and may include to (i.e. from watcher to presentity), from (i.e. from presentity to watcher), or both (i.e. to and from), to indicate the direction of subscription flow.

Further, a privacy element attribute could be utilized as an indicator of whether this information should be shared and if so, with whom.

The above list of element attributes is not exhaustive, and other element attributes could be utilized for a presence data service.

The present disclosure provides for a roster based mechanism. As used herein, a roster is a data structure used to "capture" a user's list of direct or indirect contacts. The roster solves the problem of a presentity having to identify (and potentially) authorize a watcher (or prospective watcher). The roster is an internal structure composed and maintained by the presence service. In a preferred embodiment, it is not a contact list overtly visible or modifiable by a presence user.

Reference is now made to FIG. 1. FIG. 1 illustrates a block diagram of a presence system having a first user 110 and a second user 112. First user 110 wishes to share her "presence aware" business card with second user 112. First user 110, utilizing a terminal 120 sends the business card to a relay 130. Terminal 120 could be any terminal, including, but not limited to, a wireless handset, a laptop computer, a desktop computer, a mobile device, a personal digital assistant, a wireless appliance, among others.

Relay 130 determines the type of message and routes the message through an email server 132. The email server 132 then directs the message to a recipient terminal 140, which, in this case, is the terminal of second user 112.

Second user 112 opens the email on terminal 140. This action causes an update message to be sent to relay 130 indicating the opening of the business card. In accordance with the present disclosure, the indication has the net effect of establishing user B within user A's roster, and vise versa. This is shown by having a presence service 150 notified of the connection between first user 110 and second user 112. The presence service 150 maintains a roster for each presentity, and the indication received by the presence service 150 results in the updating of a roster 160 and 162, representing the rosters of first user 110 and second user 112 respectively.

In the structure of FIG. 1, presence service 150 further communicates with a location platform 170, which is utilized to provide a location of a user. In this case, locations can be published from the location platform and location information can be consumed by various watchers, including second user 112.

The embodiment of FIG. 1 further includes a rule server 180. The rule server 180 operates to provide and uphold semantics surrounding presence information elements. For example, rule server 180 may be used to answer questions such as "notify me when I am close to anybody that is on my friends list". Thus, for example, if user 110 wishes to be notified when various friends are close by (e.g. second user 112), the rule server 180 can be used to provide this notification to user 110.

The example of FIG. 1 above shows a direct contact between first user 110 and second user 112, and how the direct contact is used to update the roster of the users.

In a further embodiment, indirect contact can also result in the updating of a roster for a user. Indirect contact is, for example, when a first user 110 sends an email to a user X. In this case, user X is overtly added to the roster of first user 110 if the user X is not already on the roster of user 110.

However, if user X then replies to the email and adds, for example, as a carbon copy, user B and user C, then relay 130 may, in one embodiment, inform the presence service 150 to add user B and user C to the first user 110's roster as indirect contacts.

The roster is used by the presence server to maintain a logical matrix. For a given user, the logical matrix comprising contacts versus presence information elements. The complexity of a presentity having to identify and potentially authorize each watcher or prospective watcher a user may communicate with or report status to, is reduced or virtually eliminated through a roster mechanism. Further, the roster also may establish all possible communication paths between a presentity and interested observers, automatically, as the presence service is informed by the communication infrastructure.

In one embodiment the matrix consists of a first column representing other users the first user 110 has interacted with either directly or indirectly. The rows consist of presence data elements. The intersection of a given row and column comprises a cell containing a data element along with the associated element attribute value for the corresponding user (i.e. watcher).

Reference is now made to FIG. 2. FIG. 2 shows an exemplary roster matrix for a first user 110. FIG. 2 illustrates a roster in which the headings of the first row contain elements and attributes that a user may expose to a watcher.

Further, the first column is a list of users that the first user 110 has come into contact with either directly or indirectly.

Thus, for example, in FIG. 2, the user has come into contact with various entities, including one identified by "id1", shown as cell 210, "id2" shown as cell 212 and user B, shown as cell 214.

Elements or attributes are shown in the first row. Column 220 includes a telephone number, column 222 includes a fax number, column 224 includes an address, column 226 includes a title and column 228 includes an alternative address. Such attributes shown in FIG. 2 are not meant to be limiting and other elements or attributes would be known to those skilled in the art, having regard to the present disclosure.

In each data cell various information can be inserted. Thus, for user B, a telephone number that user A authorizes to share is placed in cell 230. Cell 230 further includes a data attribute 232, which is a mask using a data word to encapsulate the attributes, as described in more detail below.

The roster matrix of FIG. 2 provides an indication of all other presence users that the first user 110 has interacted with, including an applicable set of presence information elements. Those presence elements in FIG. 2 correspond to a "presence aware" business card, in one embodiment.

In FIG. 2 various cells are marked with an "X" including cell 236. The "X" is used to indicate that there is no data value given for the presence user in question or the user for the corresponding row does not have sufficient privileges to receive the associated data element.

Cells that include a data value are published to a given user defined by the cells data element attribute. As an example, the second user, referred to in FIG. 2 as "User B" is permitted to continuously receive the first user's 110 telephone number data using a Unicode string, as indicated by the data attribute 232.

In addition, according to the example of FIG. 2, the user with the identification "id2" receives a variant of the user's "address element" on a one-shot (i.e. one time) basis. This is done in accordance with the data attribute 242.

Figure 3:
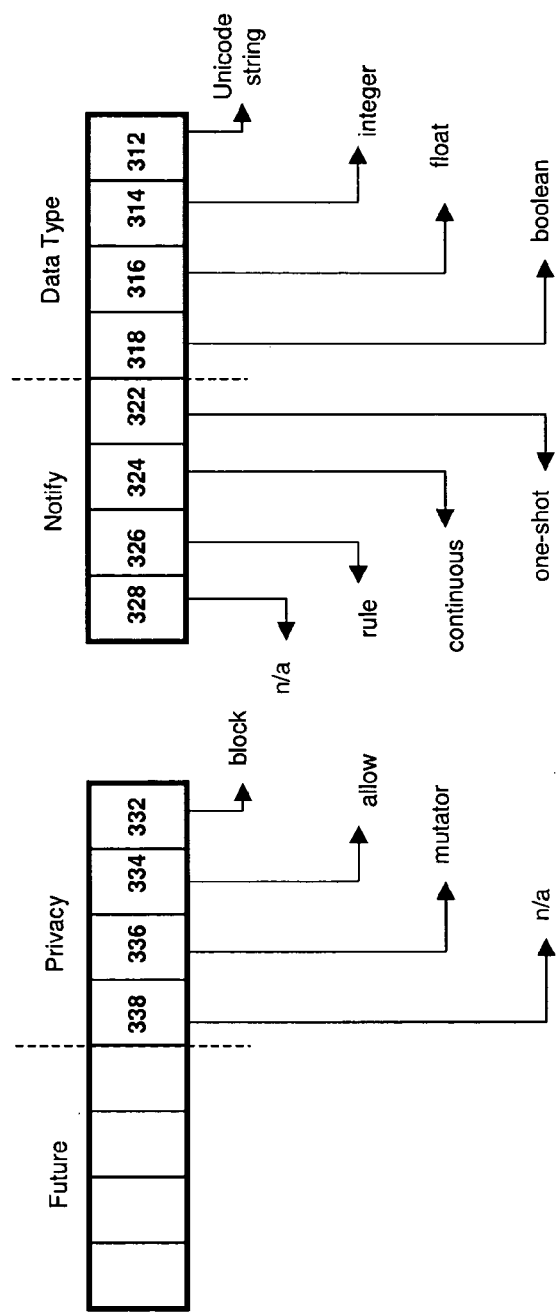
FIG. 3 is a block diagram of an exemplary mask to be applied to data element attributes.

Reference is now made to FIG. 3. As noted above, each cell has an associated data element attribute. The attributes, in the example of FIGS. 2 and 3 are characterized using a data word to encapsulate attributes such as data type, notification and privacy. In the examples of FIG. 2 and FIG. 3, each specific attribute is mapped into a nibble of the high or low order bytes. This is however not limiting, and variations of protocol level presence data element attributes encoding could include tag length encoding/value or a static field structure.

A presence data element attribute mask is illustrated in FIG. 3, and includes a mask for each separate byte. Thus, from FIG. 2, the telephone number visible to User B indicates data which is specified as "+19085551212 and a data attribute 232 of 0x0221. The mask is parsed in accordance with the attribute mask of FIG. 3. In particular, the least significant digit is a "1" in the 0X0221 this nibble is applied to the data type. In this case, the "1" indicates that the "1" when written as a binary nibble is represented as 0001 and thus indicates that the data type is a Unicode string in accordance with box 312 of FIG. 3.

If the least significant nibble was a "2" it would indicate that the data type was an integer in accordance with box 314 of FIG. 3.

If the least significant nibble was a "4" then the data type is a float in accordance with box 316 of FIG. 3.

If the least significant nibble was an "8" then the data type would be boolean (i.e. true or false) in accordance with box 318 of FIG. 3.

The next least significant digit in the data attribute represents a notification attribute. In this case, the 0x0221 includes a "2" as the second most least significant nibble. Written in binary this is 0010 and thus, in this case, the value is mapped box 324 for which indicates the notification is continuous.

If this digit was a "1", the value would map to box 322 which indicates that a one-shot notification should be utilized, therefore ensuring that the notification only occurs one time before it is blocked.

If the value of the notification was a "4" then box 326 would be utilized, indicating a rule should be applied for the notification.

The final box of the notification is unspecified, but in the example of FIG. 3 it is indicated as box 328.

The next least significant nibble indicates a privacy value. Thus, the mask includes a box 332 used to indicate that a block should be utilized for privacy.

A box 334 indicates that the privacy policy is to allow the information to be provided.

A box 336 indicates that the privacy is a mutator, indicating that the privacy changes. Various rules could be applied when the privacy changes, including but not limited to indirection.

Finally, the privacy includes a box 338, which is not implemented and is therefore not applicable.

In the case of data attribute 232 from FIG. 2, the third nibble is a "2", or binary 0010, and thus the privacy policy is to allow the information to be provided.

A fourth nibble in the mask of FIG. 3 is currently not utilized and is provided for future use.

As will be appreciated, the combination of data, along with the mask values in a data attribute, allow for various information to be shared. The attribute indicates the data type for the sharing, notification rules and privacy settings to be easily applied for the sharing of presence data.

The above therefore allows the presence server to quickly obtain information and distribute the presence information, rather then reactively authorize the distribution of information. It provides a much less verbose structure for determining authorization and publication rules relating to published presence information.

Referring again to FIG. 2, various options further exist to include indirection. Thus, for example, as seen within cell 240, instead of providing a data value, indirection could be utilized to provide a pointer to point to a different element or cell. In this case, cell 240 points to cell 250, which provides an address.

Further, applying the data attribute 242 that is in cell 240, the 0x0411 when utilizing the attribute mask of FIG. 3 indicates that the element is a Unicode string, it is a one-shot notification providing the address only once, and the privacy policy indicates that it is a mutator, thus indicating that the associated indirection may change (e.g. after initial notification).

The roster of FIG. 2 allows optimized attribution of metadata being distributed. The matrix associated with the roster allows the presence server to associate, for each user on the presentities roster, what metadata the watchers can see and, by extension, what circumstances and when the watcher receives this information.

Changes to the data can be made for the watcher, and include an applicable watcher data type, such as the format that the watcher receives data. Data can also be changed to provide how a watcher is to be notified.

The data can also be varied to include a subscription to indicate whether the element is sharable in one direction or both directions. While subscription is not shown in the example of FIG. 2, one skilled in the art would realize that it can be added as an element or attribute, or incorporated as part of the attribute set mask.

Subscription is useful, for example, when sharing metadata elements of a business card. A user 110 might specify that all data elements have bi-directional subscriptions. Therefore, when the second user 112 subscribes to the first user's data, each side is implicitly subscribed to the other side's business card information, since both are watchers and presentities with the other. The result is that the first user 110 never has to explicitly subscribe for the business card of second user 112, since a subscription is already in place. The result is savings in message overhead, as user 110 is implicitly subscribed to user 112.

As will be appreciated by those skilled in the art, the data attributes and elements for each entity on a roster needs to be appropriately populated.

While the example of FIG. 1 indicates that the sharing of a business card or the sending of an email may predicate the population of a roster, the population of the roster matrix of FIG. 2 may take several forms. A default mask could be applied when in a context or situation of information sharing is not known. Thus, the roster may by default only expose the public identity of first user 110 such as an email address and a display name.

Further, an attribute set mask could also correspond with the application that indicated the roster update. Thus, the sharing of business cards means that an implicit authorization is given to provide a "title", "business address", "business email", "contact information" among others. The use of a business card and the sharing of a business card indicates that it is a business relationship and this may be used to populate the matrix of FIG. 2.

In a further embodiment, the expansion of "eligible" metadata attributes/mask based on relationships could be used. For example, if the first user 110 phones second user 112 after the emailing, this may indicate that a certain relationship exists and may automatically cause the matrix to be updated in both of rosters 160 and 162 respectfully.

Further, an overt update of metadata attributes or masks by a presentity through some sort of policy mechanism could be utilized. For example, user 110 could update what user 112 or a collection of other users can see through a policy mechanism that is translated or transformed into a mask of FIG. 3 to be applied to the matrix of FIG. 2.

In a further alternative embodiment, an administrative application by an information service administrator or administrative principal may establish or update information within the roster matrix to establish what the default mask should be.

The advantages of using a roster with a distribution matrix is illustrated with reference to FIGS. 4, 5 and 6 below.

Figure 4:
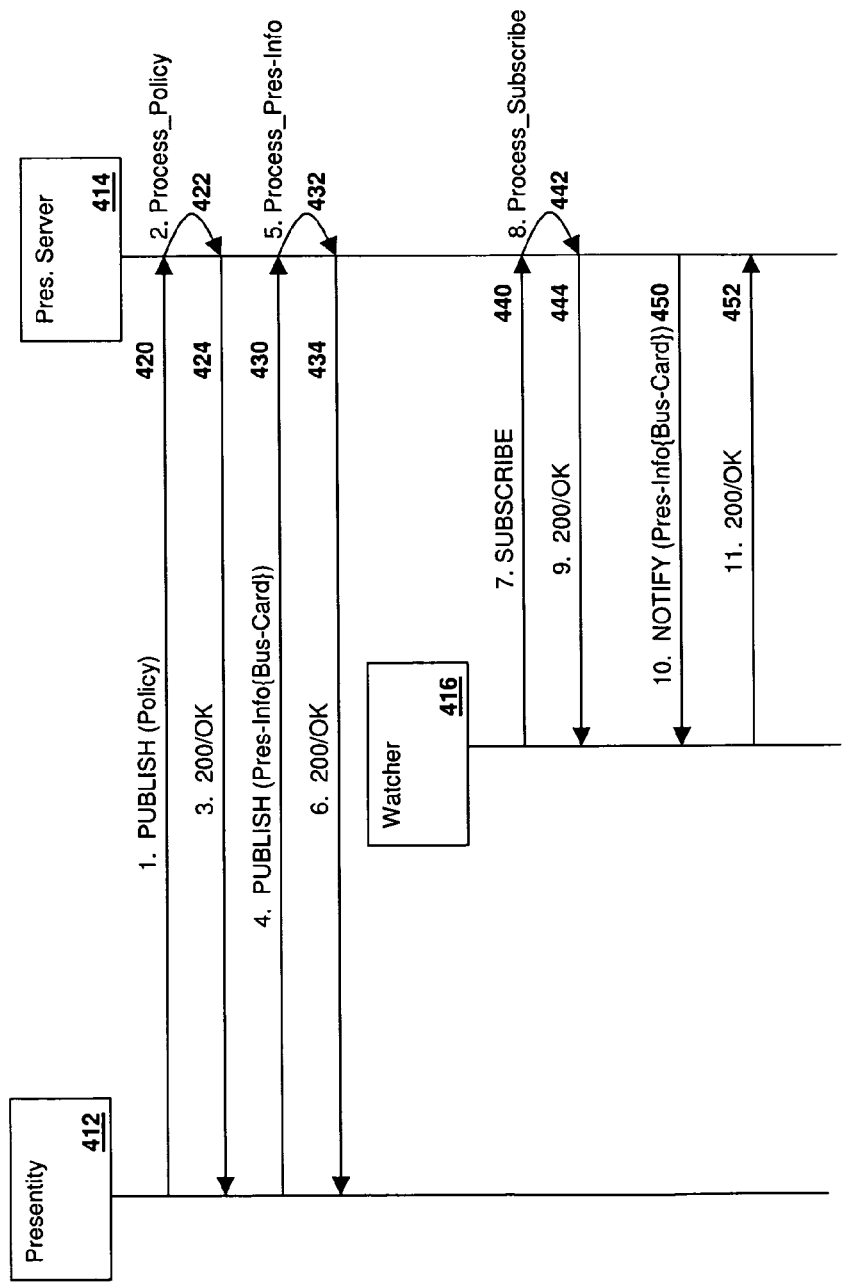
FIG. 4 is a data flow diagram showing communications in a proactive presence system without a roster.

FIG. 4 illustrates a simple presence publication and subscription utilizing proactive authorization. In particular a presentity 412 communicates with a presence server 414. Further, a watcher 416 also communicates with presence server 414.

In order to allow a watcher 416 to obtain presence information from presentity 412 various steps need to be taken. In particular, presentity 412 must first publish a policy to presence server 414, as shown by arrow 420. Presence server 414 then processes the policy as shown by arrow 422 and returns an acknowledgement, as shown by arrow 424.

Once the policy is published, presentity 412 can then publish, to presence server 414, a presence aware business card, shown by arrow 430. Presence server 414, as shown by arrow 432, processes the presence information. If the processing is successful then an acknowledgement is sent back to presentity 412 as shown by arrow 434.

In order for watcher 416 to obtain presence information regarding presentity 412, watcher 416 must first subscribe for the information of presentity 412 through a subscription message, as shown by arrow 440. The subscription message is processed by process server 414, as shown by arrow 442, and if the processing is successful an acknowledgement is sent back to watcher 416, shown by arrow 444.

Based on the policy that was published at arrow 420, the presence server 414 may proactively provide notifications to watcher 416 regarding presentity 412. In this case, presence server 414 notifies watcher 416 of the presence aware business card of presentity 412, shown by arrow 450 and watcher 416 acknowledges the notification as shown by arrow 452.

Figure 5:
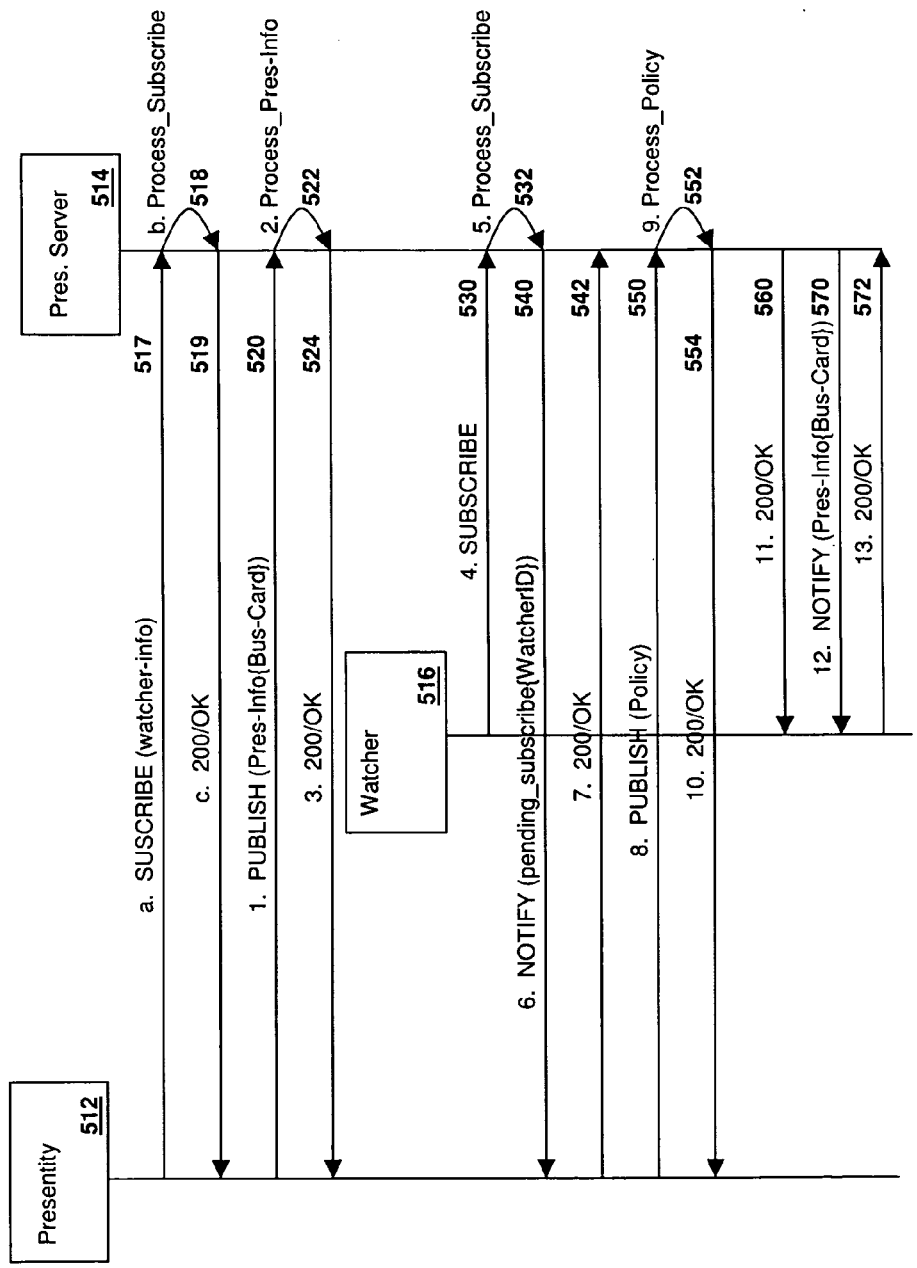
FIG. 5 is a data flow diagram showing communications in a reactive presence system without a roster.

Referring to FIG. 5, a reactive subscription model could also be utilized. In this case, a presentity 512 communicates with a presence server 514. Further, a watcher 516 also communicates with presence server 514.

Presentity 512 subscribes for watcher-info of presence server 514, as shown by arrow 517. The presence server 514 processes the subscription, as shown at arrow 518, and then sends an acknowledgement 200/OK back to presentity 512, as shown by arrow 519. The subscription ensures that the first user can receive a 'reactive authorization notification' from the presence server 514, when user 516 subscribes for presentity 512 (and no policy for user 516 exists)

The presentity 512 then publishes a presence aware business card to presence server 514 as shown by arrow 520. The presence aware business card is processed at presence server 514, shown by arrow 522 and an acknowledgement is returned to presentity 512, as shown by arrow 524.

Watcher 516 wishes to obtain presence information for presentity 512. In order to do this, watcher 516 first sends a subscription request to presence server 514, as shown by arrow 530. The subscription request is processed at presence server 514, shown by arrow 532. Since the presence model is a reactive authorization model in the example of FIG. 5, then presence server 514 provides a notification to presentity 512 indicating that watcher 516 wishes to subscribe for the information of presentity 512, as shown by arrow 540. Presentity 512 provides an acknowledgement back to presence server 514, as shown by arrow 542.

Presentity 512 then publishes a policy, as shown by arrow 550. The policy published indicates whether watcher 516 can subscribe to the information of presentity 512 and further what information is allowed to be shared. The policy is processed at presence server 514, shown by arrow 552. As a result of the processing, an acknowledgement is sent to presentity 512 as shown by arrow 554. Further, an acknowledgement is also sent to watcher 516 as shown by arrow 560. The acknowledgement at arrow 560 acknowledges that the subscription to the presentity was allowed and provides an indication to watcher 516 that notification(s) will follow.

A notification is thereafter sent to watcher 516 providing the presence aware business card of presentity 512, shown by arrow 570. Watcher 516 acknowledges the notification, shown by arrow 572.

With regard to both FIGS. 4 and 5, a significant amount of signaling is required for the watcher to subscribe to presentity 412 or 512, and for the presentity 412 or 512 to publish policy information.

Figure 6:
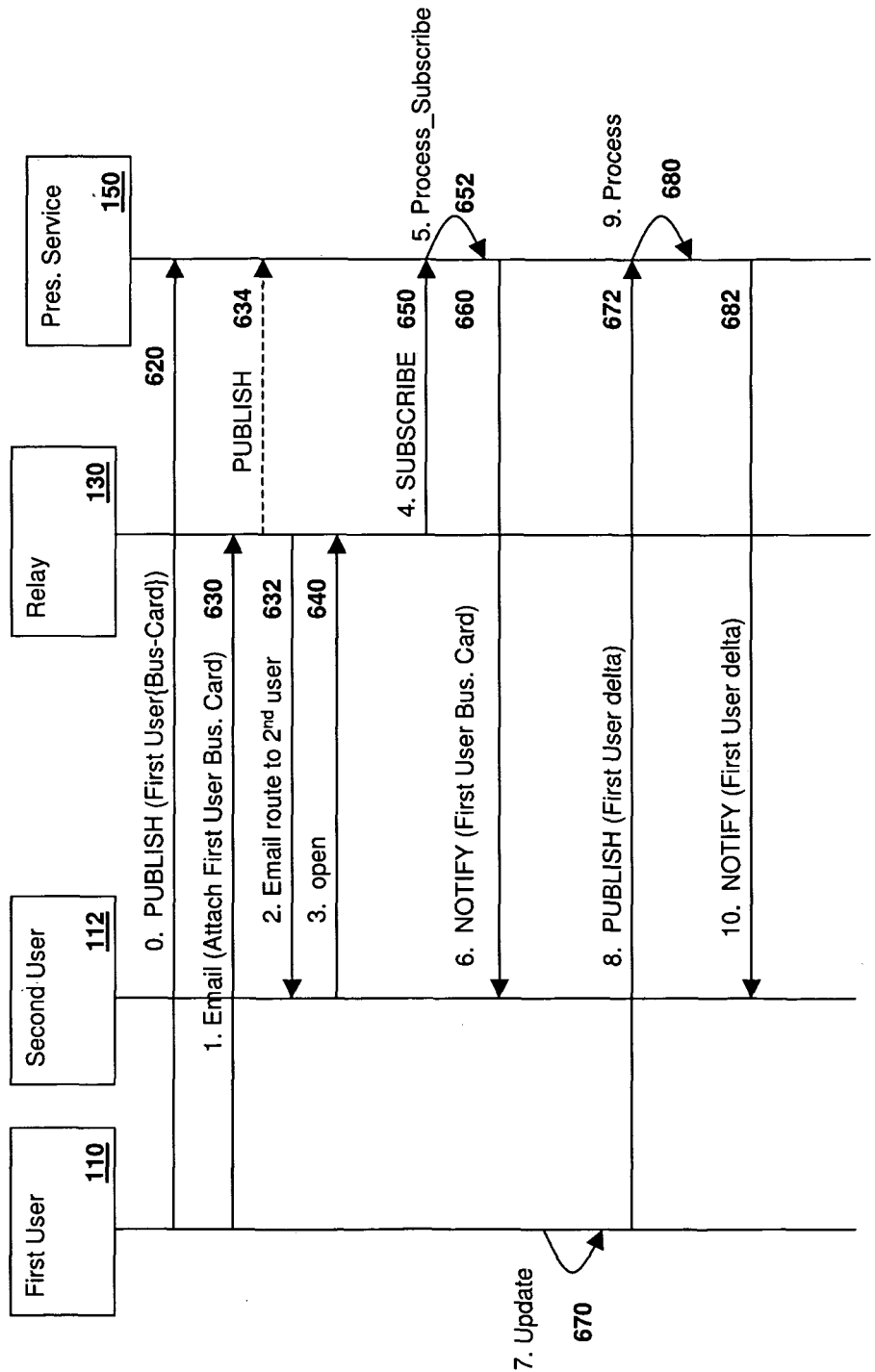
FIG. 6 is a data flow diagram showing communications in a presence system with a roster.

Reference is now made to FIG. 6. FIG. 6 shows a first user 110 and a second user 112 that can communicate with each other. A relay 130 can receive messages from first user 110 or second user 112, as illustrated above with reference to FIG. 1. Further, a presence service 150 is capable of communicating with relay 130 and also with first user 110 and second user 112.

In one embodiment, first user 110 can publish the presence aware business card to presence service 150, as shown by arrow 620.

Subsequently, first user 110 may send second user 112 an email in which a reference to the presence aware business card is made. This is done by sending the email through relay 130 as shown by arrow 630 and having the relay 130 route the email to second user 112 as shown by arrow 632. The business card attachment for these messages can merely be a link, such as a uniform resource locator (URL) since the business card has already been published with presence service 150.

In an alternative embodiment, instead of publishing the business card, shown by arrow 620, the first user 110 could send an email to second user 112 as shown by arrow 630. In this case, the email includes the presence aware business card attached thereto. Relay 130 takes the presence aware business card from the email and publishes it to presence service 150 as shown by arrow 634. The presence service 150 can then automatically establish roster entries, since it knows who the originator and target(s) are (of the business card). As used here, publish can include the roster, the data attribute's, and the masks that provides the authorization. The creation of a row in the roster matrix for the first user 110 or the second user 112 also populates the row with information. Rules are implied from the 'data attribute mask'.

The email is then routed to the second user 112 as shown by arrow 632.

If second user 112 opens the email or business card then a notification is sent to relay 130 as indicated by arrow 640 which indicates to relay 130 that first user 110 and second user 112 should be subscribed to each other for presence purposes.

Relay 130 then sends a subscription to presence service 150, as shown by arrow 650 and the subscription is processed, as shown at arrow 652. The processing at arrow 652 refers to processing populated roster entries in the roster matrix for the second user 112 to establish what to send and in what format.

Subsequent to the processing at arrow 652 a notification is provided to second user 112, including the presence aware business card of first user 110. This is shown at arrow 660.

At a subsequent time, first user 110 is promoted and the employment title of first user 110 changes to "director". First user 110 updates the business card as shown by arrow 670 and this change is then published to presence service 150, as shown by arrow 672.

Presence service 150 processes the publication of the delta information (change in title), as shown at arrow 680, and provides a notification to the second user 112, as shown by arrow 682. Further, the delta has an impact to appropriate cell(s) in the roster matrix, including the fact that user 112 must be notified of a change applicable to the business card. The notification at arrow 682 is provided since the roster of first user 110 includes an entry indicating that second user 112 should be notified of the allowed information continuously and since an update was detected for the business card of first user 110.

As will be appreciated by those skilled in the art, the notification at arrow 682 is facilitated for presence service 150 by merely having to search through the roster of first user 110 when first user 110 changes its information to indicate who should be notified.

FIG. 6 illustrates that messaging required to publish policies and to subscribe to presence information is reduced through the use of the roster and distribution matrix of FIG. 2. This saves network resources and battery life on the terminal of first user 110 or second user 112, for both scenarios, but especially for the reactive authorization scenario.

Figure 7:
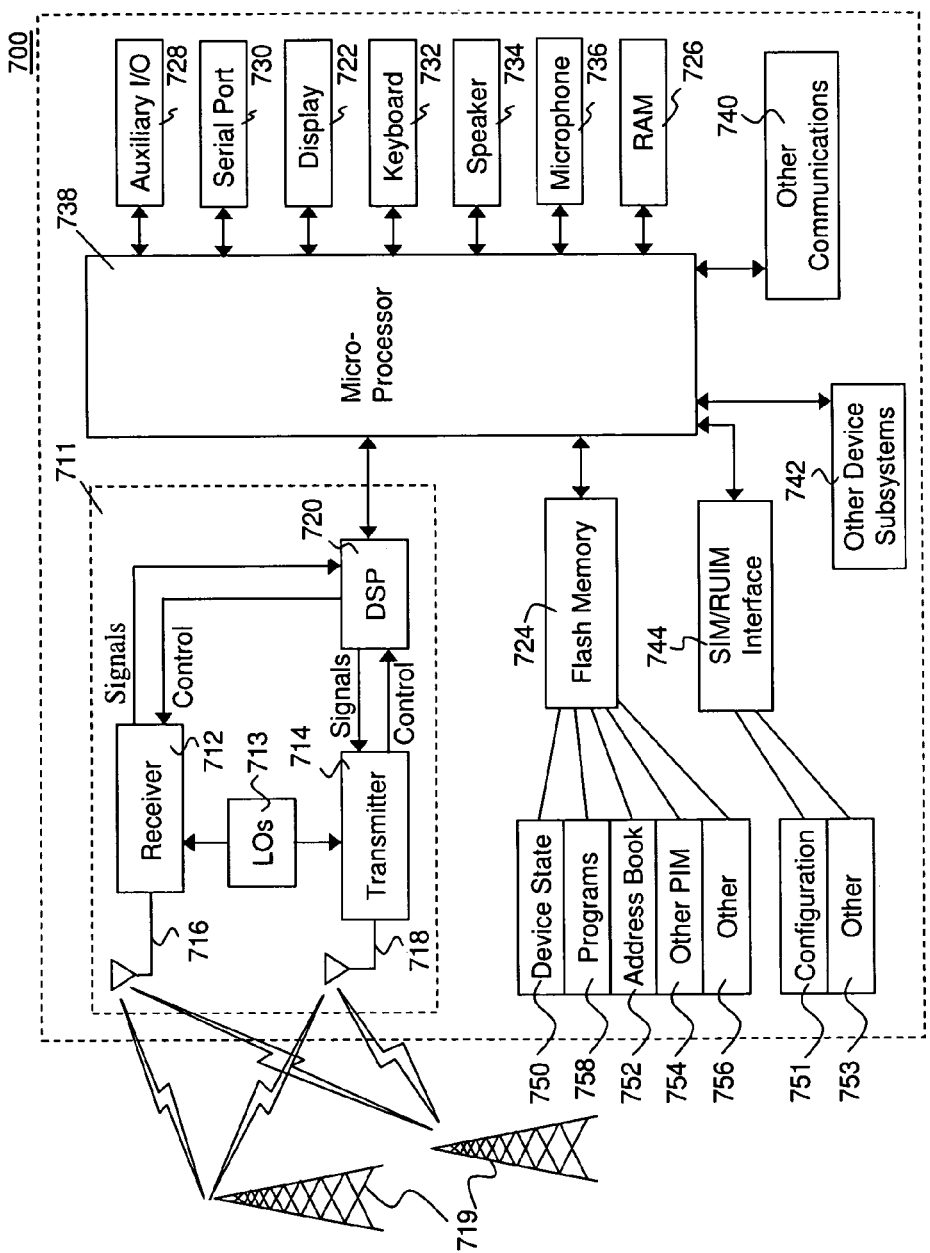
FIG. 7 is a block diagram showing an exemplary mobile device capable of being used with the present systems and methods.

If the terminal of first user 110 or second user 112 is a wireless device, one exemplary mobile device capable of being used is illustrated in FIG. 7.

Mobile device 700 is preferably a two-way wireless communication device having at least voice and data communication capabilities. Mobile device 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate.

Network access requirements will also vary depending upon the type of network 719. In some CDMA networks network access is associated with a subscriber or user of mobile device 700. A CDMA mobile device may require a removable user identity module (RUIM) or a subscriber identity module (SIM) card in order to operate on a CDMA network. The SIM/RUIM interface 744 is normally similar to a card-slot into which a SIM/RUIM card can be inserted and ejected like a diskette or PCMCIA card. The SIM/RUIM card can have approximately 94K of memory and hold many key configuration 751, and other information 753 such as identification, and subscriber related information.

When required network registration or activation procedures have been completed, mobile device 700 may send and receive communication signals over the network 719. As illustrated in FIG. 7, network 719 can consist of multiple base stations communicating with the mobile device. For example, in a hybrid CDMA 1× EVDO system, a CDMA base station and an EVDO base station communicate with the mobile station and the mobile device is connected to both simultaneously. The EVDO and CDMA 1× base stations use different paging slots to communicate with the mobile device.

Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile device. A predetermined set of applications that control basic operations, including at least data and voice communication applications for example, will normally be installed on mobile device 700 during manufacturing. Other applications could be installed subsequently or dynamically.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the microprocessor 738, which preferably further processes the received signal for output to the display 722, or alternatively to an auxiliary I/O device 728.

A user of mobile device 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile device 700 is similar, except that received signals would preferably be output to a speaker 734 and signals for transmission would be generated by a microphone 736. Alternative voice or audio I/O subsystems, such as a voice message recording subsystem, may also be implemented on mobile device 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for distributing data between a first user and a second user comprising:
   detecting communication between the first user and the second user;
   creating an entry for the second user in a roster for the first user;
   populating the entry for the second user in the roster of the first user with data elements, each data element of the data elements corresponding to a data attribute, said data attribute indicating how the corresponding data element is to be shared; and
   utilizing the roster of the first user to distribute data reflecting the first user to the second user.

2. The method of claim 1, wherein the detecting communication comprises:
   receiving a communication from the first user to the second user; and
   receiving a notification the second user has opened or referenced the communication.

3. The method of claim 1, wherein the utilizing checks the attribute of the data element for the second user.

4. The method of claim 1, wherein the communication is an indirect communication.

5. The method of claim 4, wherein the indirect communication is a carbon copy of a communication of the second user in a communication to the first user.

6. The method of claim 1, wherein a data element attribute provides indirection to another data element.

7. The method of claim 1, wherein the populating utilizes one or more of:
   a default mask based on a context or situation;
   a mask based on an application that initiated a roster update;
   an update mask based on further communication between the first user and the second user;
   an overt update mask based on a policy of the first user towards the second user or a plurality of other users; and
   an administrative application.

8. A method for distributing data between a first user and a second user comprising:
   detecting direct or indirect communication between the first user and the second user;
   creating an entry for the second user in a roster for the first user;

populating the entry for the second user in the roster of the first user with data elements and attributes of the data elements, said data elements and attributes of the data elements indicating what data can be shared with the second user and how the data is to be shared; and utilizing the roster of the first user to distribute data reflecting the first user to the second user, wherein the utilizing checks the attribute of the data element for the second user, and, wherein the attribute is a data word corresponding with a mask.

9. The method of claim 8, wherein the mask specifies attributes for at least one of notification options, privacy options, data type options and subscription options.

10. A data processing system providing a data service within a network for distributing data, the data processing system comprising:
   a computer with memory;
   a presence server executing in the memory of the computer and providing the data service, the data service configured to:
   detect communication between a first user and a second user;
   create an entry for the second user in a roster of the first user;
   populate the entry for the second user in the roster of the first user with data elements, each data element of the data elements corresponding to a data attribute, said data attribute indicating how the corresponding data element is to be shared; and
   utilize the roster of the first user to distribute data reflecting the first user to the second user.

11. The data service of claim 10, wherein the data service is one of a presence service, a location service and a content delivery service.

12. The data service of claim 10, wherein the data service, when detecting communication, is configured to:
   receive a communication from the first user to the second user; and
   receive a notification the second user has opened the communication.

13. The data service of claim 12, wherein the roster is a matrix comprising users a given data service client has communicated with versus data elements and attributes.

14. The data service of claim 10, wherein the communication is an indirect communication.

15. The data service of claim 14, wherein the indirect communication is a carbon copy of a communication of the second user in a communication to the first user.

16. The data service of claim 10, wherein a data element attribute provides indirection to another data element.

17. The data service of claim 10, wherein the populating utilizes one or more of:
   a default mask based on a context or situation;
   a mask based on an application that initiated a roster update;
   an update mask based on further communication between the first user and the second user;
   an overt update mask based on a policy of the first user towards the second user or a plurality of other users; and
   an administrative application.

18. A data service within a network for distributing data, the data service configured to:
   detect direct or indirect communication between a first user and a second user;
   create an entry for the second user in a roster of the first user;
   populate the entry for the second user in the roster of the first user with data elements and attributes of the data elements, said data elements and attributes of the data elements indicating what data can be shared with the second user and how the data is to be shared; and
   utilize the roster of the first user to distribute data reflecting the first user to the second user, wherein the attributes are data words corresponding with a mask.

19. The data service of claim 18, wherein the mask specifies attributes for at least one of notification options, privacy options, data type options and subscription options.

* * * * *